US005083200A

United States Patent [19]

Deffontaines

[11] Patent Number: 5,083,200

[45] Date of Patent: Jan. 21, 1992

[54] METHOD FOR IDENTIFYING OBJECTS IN MOTION, IN PARTICULAR VEHICLES, AND SYSTEMS FOR ITS IMPLEMENTATION

[75] Inventor: Thierry Deffontaines, Paris, France

[73] Assignee: Elsydel, Paris, France

[21] Appl. No.: 502,878

[22] Filed: Apr. 2, 1990

[30] Foreign Application Priority Data

Mar. 31, 1989 [FR] France ................................ 89 04249

[51] Int. Cl.[5] ......................... H04N 7/18; H04N 7/00

[52] U.S. Cl. .................................... 358/105; 358/108; 358/93; 358/107; 358/96; 340/942; 364/560

[58] Field of Search ................. 358/108, 105, 106, 93, 358/107, 101, 96; 340/937, 942; 356/23, 26, 237; 364/560, 562; 250/222.1

[56] References Cited

U.S. PATENT DOCUMENTS

| | | | |
|---|---|---|---|
| 2,769,165 | 10/1956 | Bower | 340/942 |
| 2,967,948 | 1/1961 | Pratt | 250/222.1 |
| 3,488,510 | 11/1970 | Raymond et al. | 250/222.1 |
| 3,678,189 | 7/1972 | Oswald | 358/108 |
| 3,685,012 | 8/1972 | Case et al. | 340/937 |
| 4,247,768 | 1/1981 | Elmer et al. | 340/942 |
| 4,433,325 | 2/1984 | Tanaka et al. | 358/108 |
| 4,752,764 | 6/1988 | Peterson et al. | 358/108 |
| 4,813,004 | 3/1989 | Fujioka et al. | 364/567 |
| 4,947,353 | 8/1990 | Quinlan, Jr. | 340/942 |

FOREIGN PATENT DOCUMENTS

| | | |
|---|---|---|
| 2102433 | 4/1972 | France . |
| 2523341 | 9/1983 | France . |
| 2154388 | 9/1985 | United Kingdom . |

OTHER PUBLICATIONS

"Optical Sensing and Size Discrimination of Moving Vehicles Using Photocell Array and Threshold Devices", *IEEE Transactions on Instrumentation and Measurement*, vol. 25, No. 1, Mar. 1976, by T. Takagi, pp. 52–55.

*Primary Examiner*—John K. Peng
*Attorney, Agent, or Firm*—Young & Thompson

[57] ABSTRACT

A method for identifying an object in motion, in particular a vehicle, includes several steps whenever the object is moving inside a predetermined identification zone following a predetermined movement axis. The steps are periodically acquiring images of the object in a predetermined field of view, checking the nature of the image background in the field of view to obtain background reference information in the absence of the object, and processing the images acquired in combination with the background reference information in order to extract therefrom a silhouette of the object having crossed the field of view. Systems for implementing the method are also disclosed. The invention may be used, in particular, with highway toll booths and for any other application demanding an identification of vehicles.

33 Claims, 8 Drawing Sheets

METHOD FOR IDENTIFYING OBJECTS IN MOTION, IN PARTICULAR VEHICLES, AND SYSTEMS FOR ITS IMPLEMENTATION

The present invention relates to a method for identifying objects in motion, in particular vehicles.

The invention is also aimed at systems for its implementation.

Road structures, such as for example bridges, tunnels, and highways, are generally equipped with toll booths in which a tax is collected from the users of the network. This tax may depend on dimensional parameters of the vehicle and, more generally, on specific physical characteristics of the vehicle which define its membership of a tariff category.

A rigorous definition of vehicle categories is established for the use of highway operators. This definition may use, by way of example, the height of the vehicle beneath the front axle, the number of axles and the type of a possible trailer.

In certain cases it may also take into account the length of the vehicle.

During the crossing of a toll station by a vehicle, the category of the latter is currently tabulated by an employee assigned to this task.

This situation poses the problem of the exactness of the determination, which may be subject to human error or to false tabulation for the purposes of fraud.

Certain devices have been designed to check the category determination partially but currently, only the differentiation between light vehicle and trucks can currently be made. In particular, the sub-categories referring to trailers are not detectable. Moreover, these devices cannot separate the vehicles and are thus only used at toll path exits, by way of "posterior automatic category detection" or post ACD, for the purposes of checking of the personnel.

The aim of the invention is to remedy these disadvantages by proposing a method for identifying an object in motion, in particular a vehicle, the said object moving inside a predetermined identification zone following a predetermined movement axis, this method thus achieving an automatic category determination prior to payment, designated by pre-ACD, so as to complete the automate billing of the toll as a function of the category detected.

According to the invention, the identification method comprises:

periodical acquisitions of images in a predetermined, rectilinear field of view, essentially vertical and of very small width relative to its height, the said field of view cutting the identification zone at a predetermined angle of intersection and defining an observation plane, a checking of the nature of the image background in the field of view, to obtain background reference information in the absence of an object in the field of view, and a processing of the images acquired in combination with the background reference information, to extract therefrom a silhouette of an object having crossed the field of view.

Thus, from the extracted silhouette, all the information necessary for the category determination of a vehicle is available. The periodic acquisitions and the processing of the images are carried out whilst the object is still in motion, which allows identification of the vehicle to be realized before it stops for the payment of a toll.

According to a preferred variant of the invention, the step for processing the images acquired comprises a step for determining specific geometric characteristics of the object to be identified, from its extracted silhouette, followed by a step for associating the said object with a category defined by a predetermined combination of specific geometric characteristics.

Thus, the problem of automatic category determination is resolved and, moreover, this determination can be carried out whatever the speed of the vehicle, only the silhouette of the latter being taken into account.

In another preferred variant of the invention, the method further comprises a succession of steps for detecting the presence of the object in fixed detection planes in the identification zone, essentially perpendicular to the movement axis, situated on either side of the field of view at predetermined respective distances from the said field of view, to provide unidimensional spatio-temporal information on the movement of the object in the identification zone, and the step for determining the length of the object following the axis of movement from the extracted silhouette and from spatio-temporal information obtained during the detection steps.

A method is thus available which makes it possible to ensure the optimization of the filling of enclosures, waiting lanes or transportation units. In fact, the length of a vehicle represents an essential parameter for determining the optimum positioning of this vehicle.

According to another aspect of the invention, the system for identifying an object in motion, in particular a vehicle, implementing the method according to the invention, the said object moving inside a predetermined identification zone following a predetermined axis of movement, comprises:

means for periodically acquiring images in a predetermined rectilinear field of view, essentially vertical and of very small width relative to its height, the said field of view cutting the identification zone at a predetermined angle of intersection and defining an observation plane, means for checking the nature of the image background in the field of view with the aim of obtaining background reference information, and means for processing the images acquired in combination with the background reference information, in order to extract therefrom a silhouette of an object having crossed the observation plane.

In an advantageous embodiment of the invention, the identification system further comprises means for detecting the presence of the object to be identified in fixed planes within the identification zone, essentially perpendicular to the axis of movement and situated at predetermined respective distances from the said observation plane, and for supplying unidirectional spatio-temporal information on the movement of the object in the identification zone, and the processing means are arranged also to determine an estimation of the length of the object following the axis of movement, from the extracted silhouette and from the spatio-temporal information coming from the detection means.

Other features and advantages of the invention will again emerge in the description which follows. In the attached drawings, given by way of nonlimiting examples:

Figure 1:
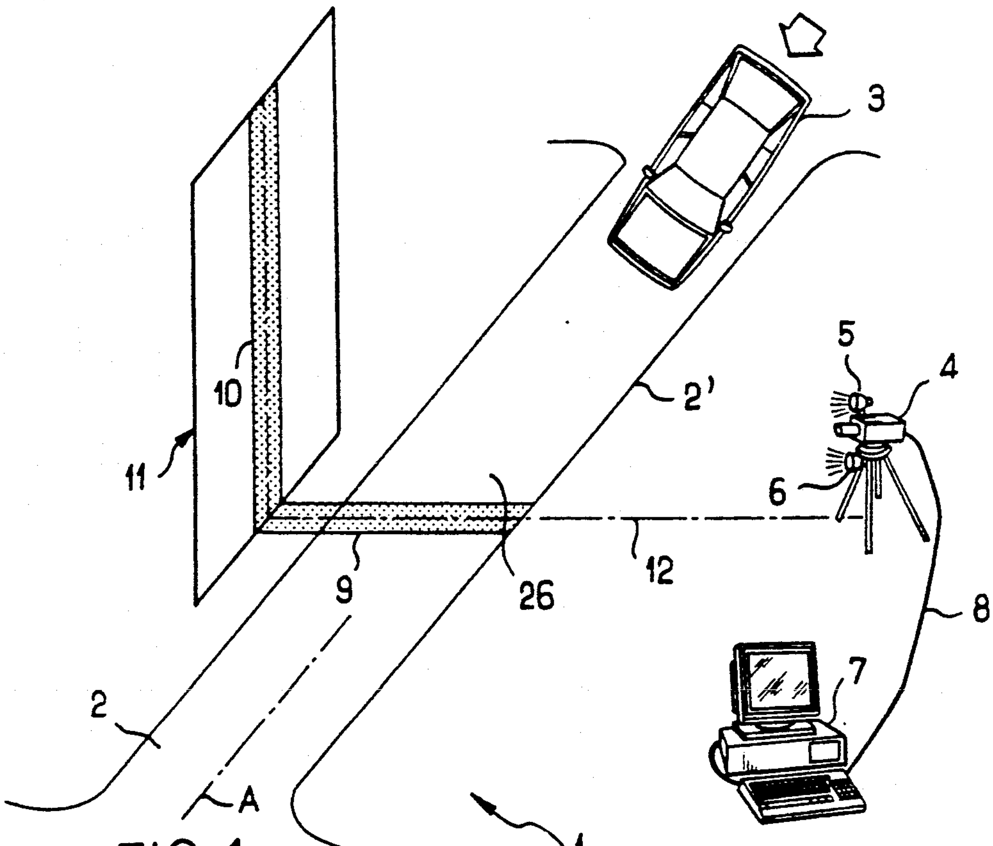
FIG. 1 is a descriptive view of a first version of the identification system according to the invention, in which the lighting means are situated in immediate proximity to the camera.

A vehicle category determination system implementing the method according to the invention will now be described, whilst referring to FIGS. 1 to 4.

This system provides a movement path 2′ within an identification zone 2, for example a toll booth arrival path. The category determination system comprises a linear camera 4 having an essentially vertical field of view 26, of very small width relative to its height, in practice perpendicular to the path 2′, and numerical processing means 7, such as a microcomputer or any other calculator, linked to the camera 4 by a connection 8.

In a first version of the system, the system 1, shown in FIG. 1, comprises lighting means 5, 6 situated in the immediate vicinity of the camera 4 and the movement path 2′ is equipped with a band 9 made of light-reflecting material, placed on the axis 12 of the field of view of the camera 4. This band preferably extends at 10 onto a vertical background plane 11 placed facing the camera 4 on the other side of the movement axis A path 2′.

Figure 2:
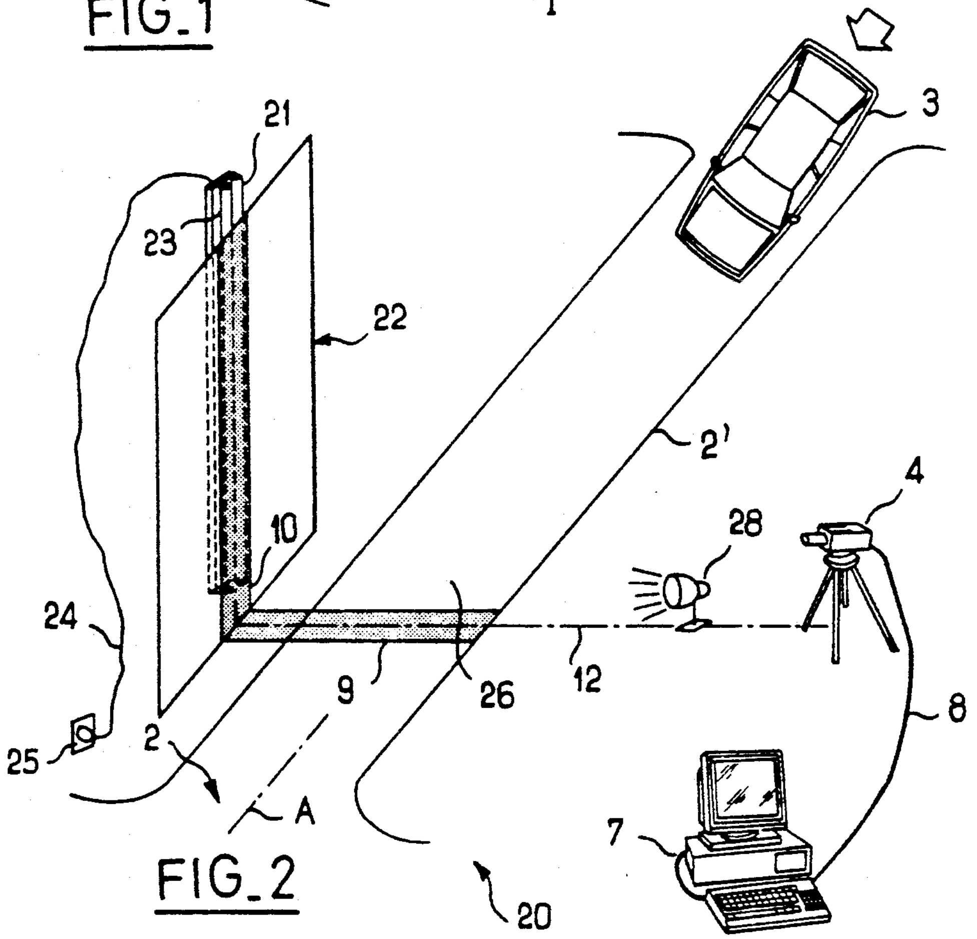
FIG. 2 is a descriptive view of a second version of the identification system according to the invention, in which a vertical lighting window is provided.

In another version, the system 20, shown in FIG. 2, comprises a lighting placed on the background plane 11 consisting of, by way of example, two vertical neon tubes 21, 23 placed in immediate proximity to the reflective band 10 and supplied from the electrical network 25 via a connection 24. A back-up lighting 28, placed in proximity to the path 2′, is however necessary to light the band 9 of the intersection of the field of view of the camera 4 and of the movement path 2′.

The linear camera 4 is preferably provided with CCD or diode type sensors. The camera delivers a narrow image in the abovementioned field of view. The camera is driven by a fixed rate clock and it is the movement of a vehicle which allows the construction of the image, as will be described in detail in the text which follows.

The linear camera 4 is placed at a predetermined height from the ground, by way of example 1.30 m, or at a predetermined height above the front reference axles currently used to distinguish the vehicle categories. The linear camera is provided with an objective whose focal length is chosen to cover the required field of view, with the available space behind. It should be noted that the choice of a linear camera provided with a larger array of CCD sensors will give a larger field of view.

The lighting is concentrated essentially on the ground of the path 2′ in the field of the camera 4 in the vicinity of the zone of contact of the wheels of the vehicle 3 with the ground. An illuminating border, not shown, can be envisaged, In the same way, a complete lighting of the field of view can be effected. In all cases, the lighting can be either continuous, or alternating, synchronous or not synchronous with the filming clock of the camera 4.

The reflective bands 9, 10 can be realized with light paint, preferably white, or with a retroreflective material.

The assembly of the lighting and light-reflecting devices ensures a checking of the nature of the background of the field of view, a checking which is essential in order to be able to extract a precise silhouette of a vehicle in motion, as will be made explicit in the text which follows.

The vertical reflective band 10 can be replaced by a luminous band consisting, for example, of a network of electroluminescent diodes or a fiber optic illuminating panel.

Figure 3:
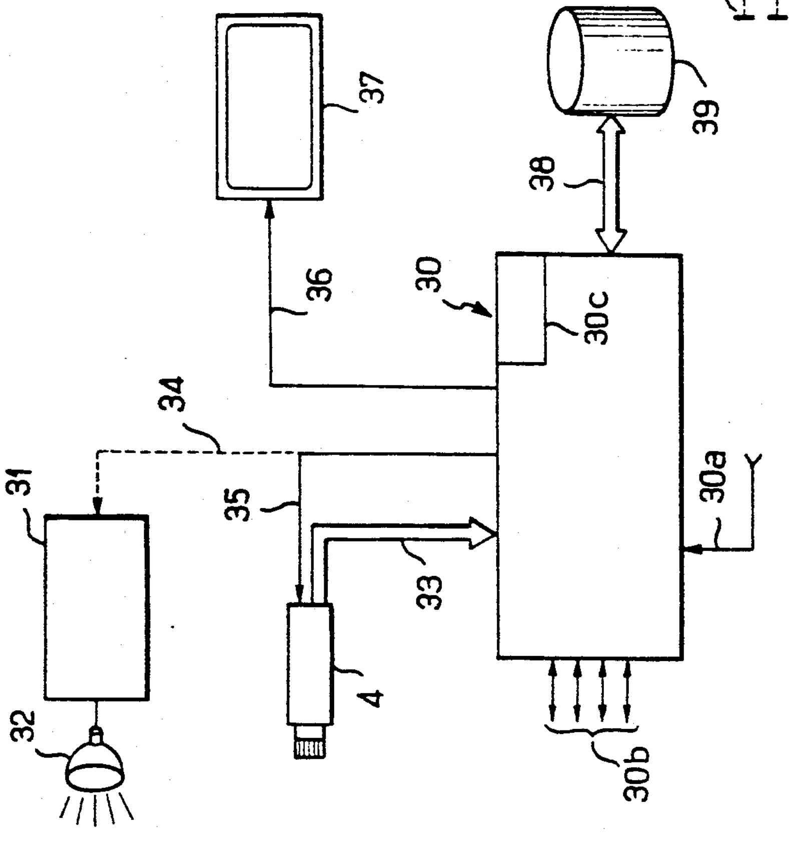
FIG. 3 is a synoptic diagram of an identification system according to the invention.

The acquisition and the processing of the images coming from the camera 4 is ensured through a central unit 30, on referring to FIG. 3. This central unit controls the linear camera 4 by a sampling clock signal 35 and receives back from the camera digitized linear images with several gray levels or in binary form. These images are processed in the central unit and lead to the realization of a silhouette which is displayed on a checking screen 37 and is stored either in the central memory 30*c* of the central unit 30, or in an external storage unit 39, such as a magnetic storage disk, a cassette, or any other information medium, linked to the central unit 30 by a digital connection 38. The central unit 30 can also exchange information, analysis results or commands with a host system via a digital connection 30*a*. When a back-up lighting 32 is provided for operation in synchronized alternating mode, a power source 31 associated with this lighting 30 can receive a synchronization signal 34 coming from the central unit 30. Other sensors or detectors, such as magnetic induction loops, optical beam detectors or another camera, matrix or linear, can be associated with the identification system and be linked to the central unit 30 via interface lines 30*b*.

Figure 4:
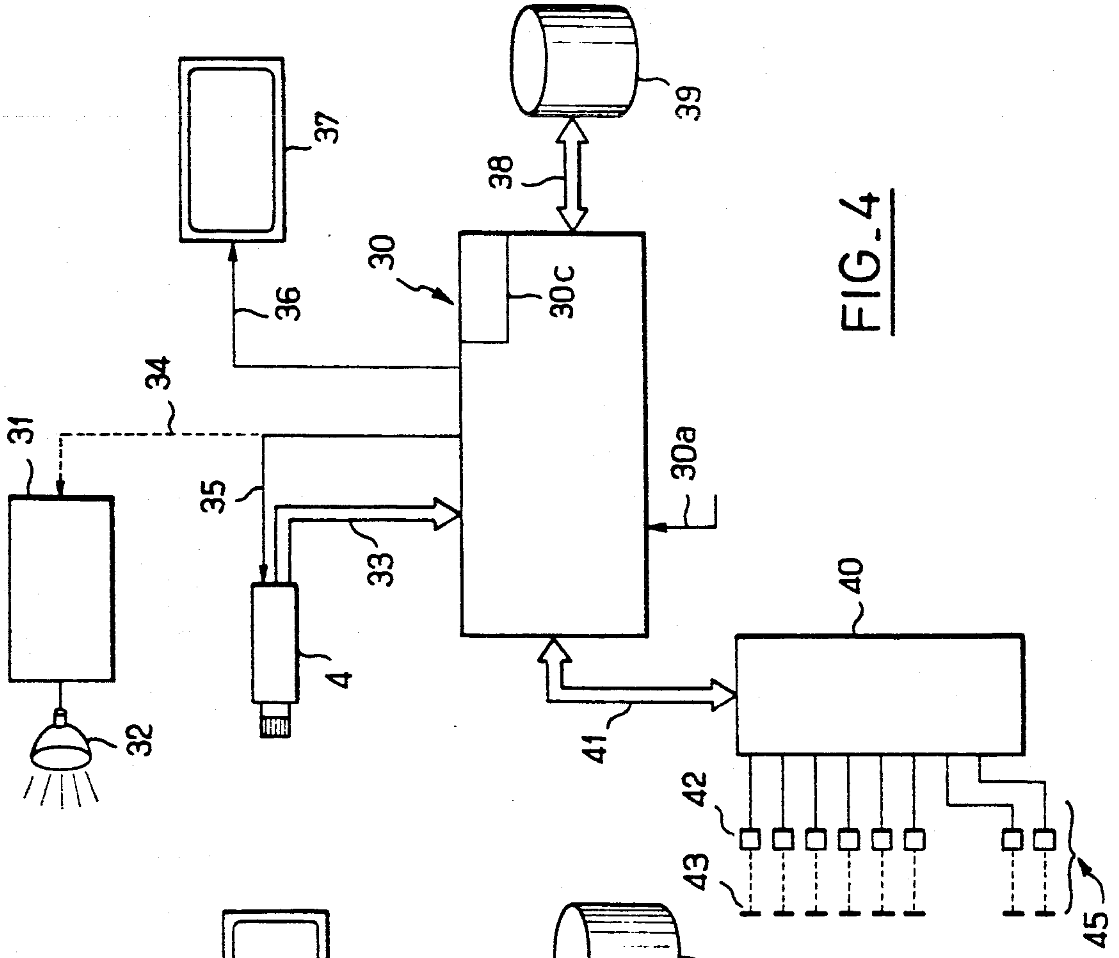
FIG. 4 is a synoptic diagram of a length determining and identification system according to the invention.
Figure 9:
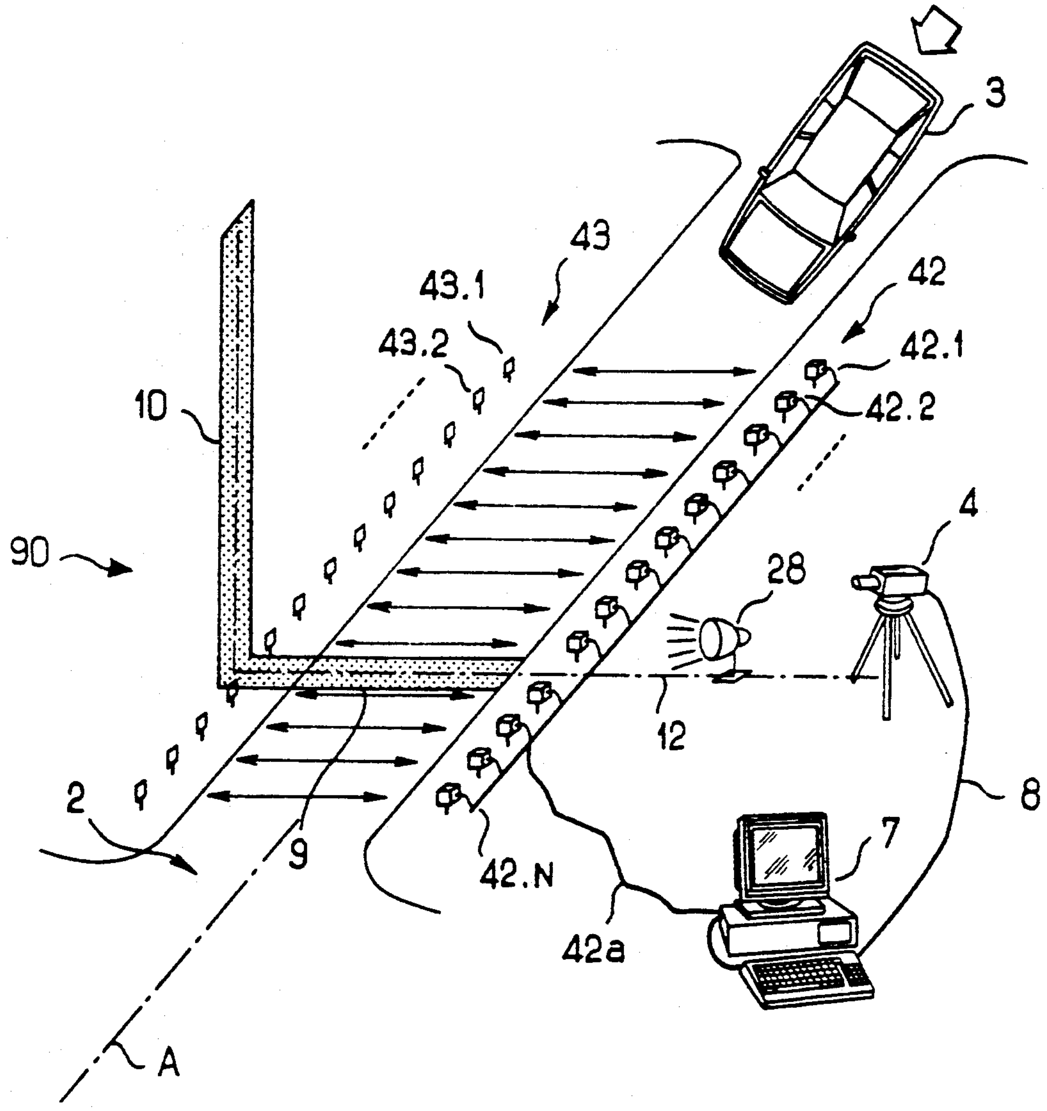
FIG. 9 is a descriptive view of a length determining and identification system according to the invention.

FIG. 4 shows precisely a version of the identification system according to the invention, in which a network 45 of optical beam devices, each consisting of an emitter receiver detector 42, 42.1, . . . 42.N and a reflector 43, 43.1, . . . , 43.N which are placed on either side of the movement path 2′, on referring to FIG. 9 which shows a length determining system 90 according to the invention. The information delivered by the battery of detectors 42, during the crossing of the identification zone 2 by a vehicle 3, are transmitted to the microcomputer or calculator 7 through a connection 42*a* and pass through an interface circuit 40 linked to the central unit 30 by a digital connection 41, on referring to FIG. 4, the interface 40, the central unit 40 and the storage unit 39 are preferably laid out within the calculator 7.

Figure 5:
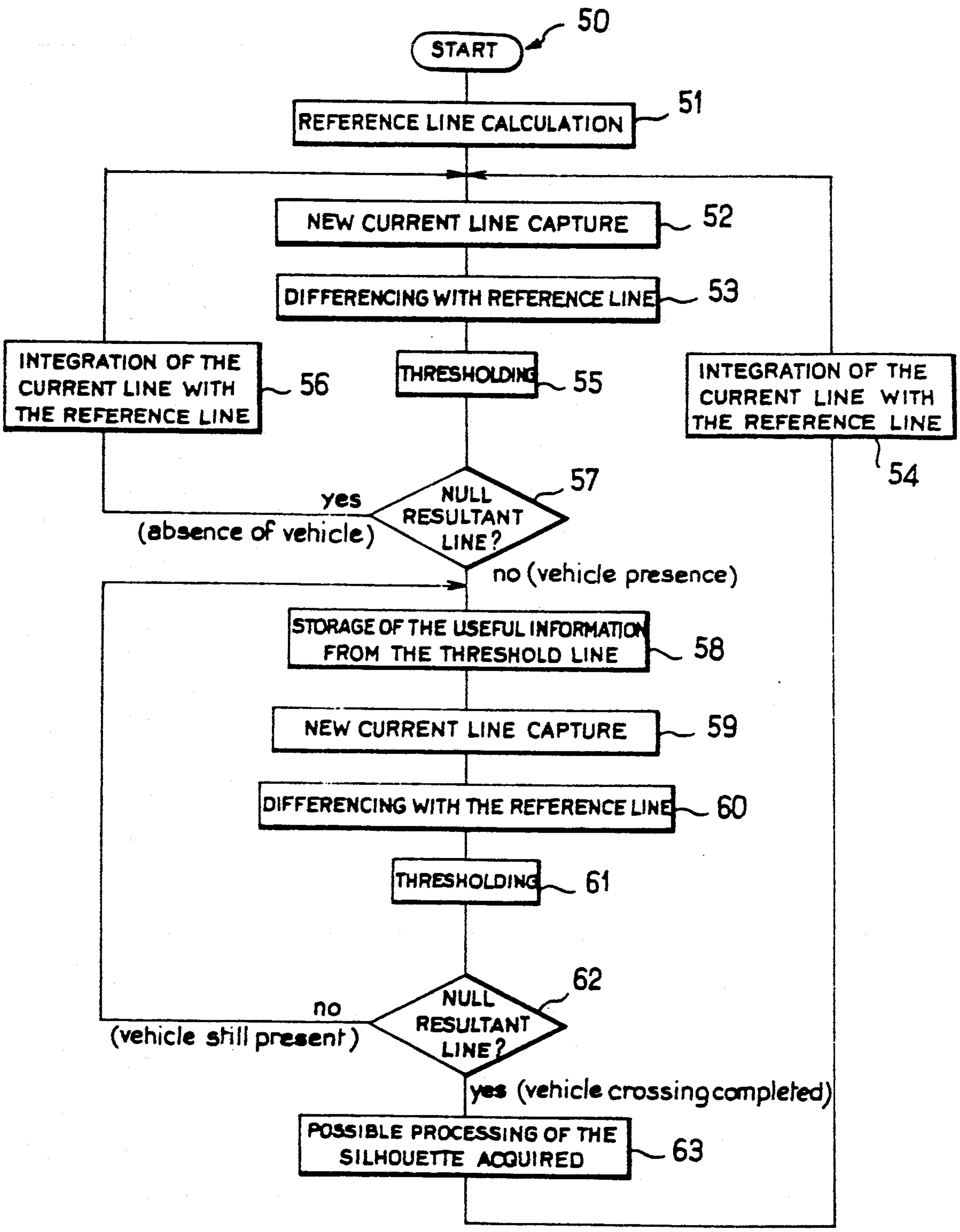
FIG. 5 is a flow diagram of the image capture part of the identification method according to the invention.

The operation of the various versions of the identification system according to the invention will now be described along with the method according to the invention, on first referring to FIG. 5.

Initially, on the absence 50 of an object or vehicle in the field of view of the linear camera 4, a linear image of the background 10 is acquired and digitized 51. For further clarity, the linear images acquired by the camera will be designated by the term lineal.

In the method the background line constitutes the reference line, which depends on the ambient luminosity and on the state of the surfaces in the field of view.

After a period of time equal to the filming time, a capture 52 of a new, current line is effected. The difference 51 between this current line and the previously acquired reference line is realized so as to detect the appearance of an object in the field of view of the linear camera. This difference is first compared, in 55, to a threshold so as to eliminate small variations of line image, less than a predetermined threshold tolerance. After this step of taking into account the threshold or thresholding, a nullity test 57 of the resultant line is carried out. If this line is null, it means that no object is in the field of view, in particular, it reflects an absence of vehicle: a step 56 for integrating the current line into the reference line allows updating of the reference line and is followed by a return to a step 52 for capturing a new current line.

If, at completion of the test 57, it is observed that the resultant line is not null, a storage 58 of the useful information from the line after the abovementioned threshold operation is carried out and is followed by a step 59 for capturing a new current line by the camera 4, a step 60 for differencing with the reference line, a step 61 for thresholding, and a resultant line nullity test step 62. If the resultant line is not null, it signifies that the vehicle or object is still present and the abovementioned steps 58 to 62 are repeated. If, by contrast, the resultant line is cancelled out, it signifies that the vehicle has left the field of view of the linear camera, and a step 63 for processing the silhouette acquired, consisting of the juxtaposition of the resultant stored lines is carried out. At the completion of this processing, an integration 54 of the current line in the reference line is carried out before returning to the abovementioned step 52 for capturing a new current line.

Figure 6:
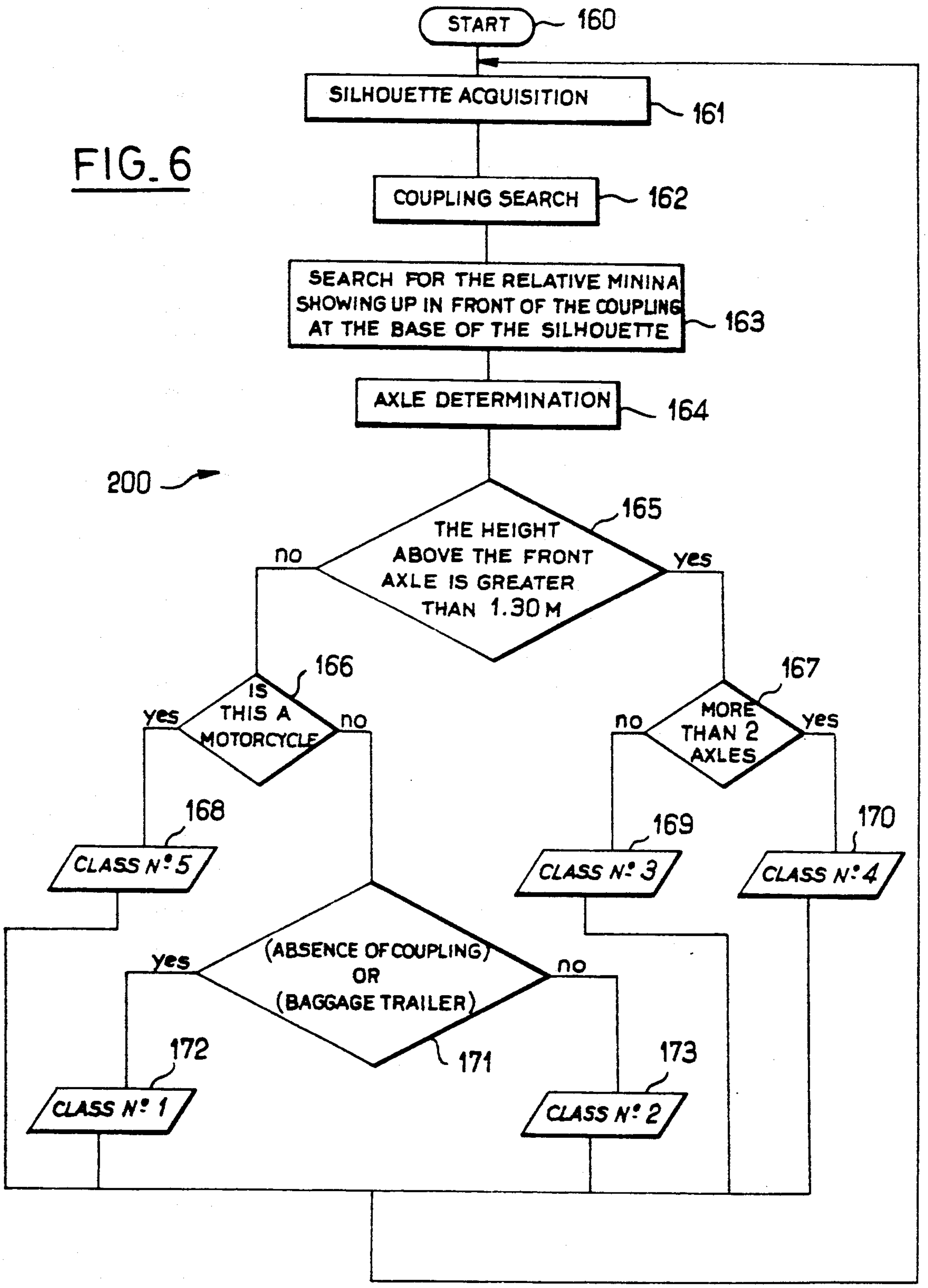
FIG. 6 is a flow diagram of a particular version of the identification method, applied to the category determination of a vehicle.

The flow diagram 200 shown in FIG. 6, illustrates a practical application of the method according to the invention, to the automatic category determination or again ACD. After an initialization phase 160 of the identification system, a silhouette acquisition 161 is carried out, as described before on referring to the flow diagram in FIG. 5.

This silhouette acquisition is carried out by juxtaposition of image lines periodically acquired, preferably at a frequency of the order of 100 Hz which in practice allows "sampling" of a vehicle every 10 cm when its speed is 36 km/hour.

From the silhouette acquired, a coupling search step 162 is undertaken. This involves comparing, for each resultant line acquired, the upper and lower silhouette limits, with the aim of locating lines for which these limits show a difference less than a predetermined value.

A search 163 is then carried out for relative minima in the silhouette acquired, which have shown up in front of the coupling at the base of the silhouette. This search allows completion of a determination 164 of the axles of the vehicle. A test 165 is then carried out to determine whether the height above the front axle of the vehicle is or is not greater than a predetermined height, for example 1.30 m. If this is the case, a test 167, bearing on the number of axles, is undertaken. If it is not the case, a test 166 is carried out to determine, from the silhouette acquired, whether the vehicle in question is a motor cycle. If this is indeed the case, the identified vehicle is classified, at 168, in the class or category no. 5. If it is not the case, a test 171 is carried out, bearing on the absence of a coupling or of a baggage trailer, at the completion of which the vehicle is classified, at 172, either in the category no. 1 (absence), or, at 173, in the category no. 2 (presence of coupling or trailer).

The test 167 bearing on the number of axles of the vehicle is followed either by a classification 169 of the vehicle in the class or category no. 3 (two axles), or by a classification 170 of the identified vehicle in the class or category no. 4 (more than two axles).

At the completion of the classification steps, a new silhouette acquisition step 161 is undertaken.

Figure 7:
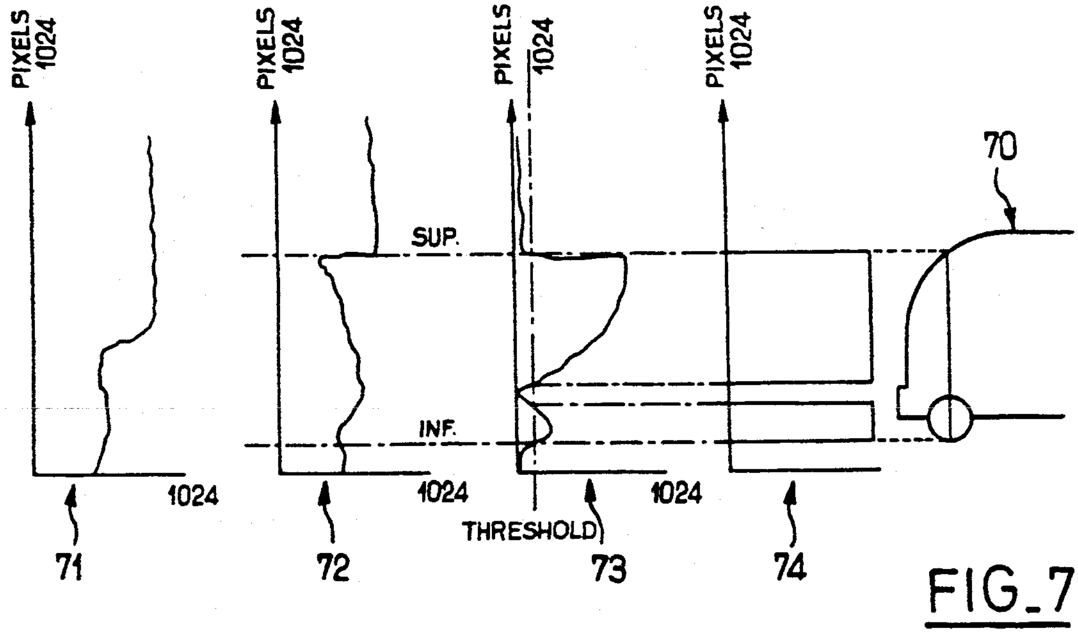
FIG. 7 shows experimental records of images of the profile of a vehicle, obtained with an identification system according to the invention.

Experimental examples of capture and of processing of line images are shown in FIG. 7. The four diagrams 71 to 74 have as abscissa a gray level value for each pixel obtained by the linear camera, with limit value 1024, and as ordinate the vertical spatial coordinate of each pixel of the camera, the total number of pixels being, in this example, equal to 1024. A high luminosity in one pixel manifests itself through a high abscissa value. On the contrary, the absence of reflection manifests itself through a near zero abscissa.

The curve 71 shows the background line captured in the absence of a vehicle in the field of view of the camera, which will be used as reference line. During the crossing of a vehicle 70, the captured line 72 suffers a notable modification. An abrupt shift in the gray level is seen at the ordinate SUP corresponding to the upper limit of the vehicle in the field of view at the moment of the acquisition of the line 72. A depression in the curve 72 at the INF level is also seen, which essentially corresponds to the base of the wheels of the vehicle. The resultant line 73 obtained from the absolute value of the difference between the two preceding lines 71, 72 well reflects the contour of the image slice acquired. The intermediate minimum probably corresponds to a part of the profile of the vehicle situated immediately above the wheels and not obscured.

After a thresholding operation taking into account a predetermined THRESHOLD parameter, a square-edged "thresholded" line 74 is achieved. The useful values for constructing the silhouette are of course the values SUP and INF which are stored for a final processing of the silhouette of the vehicle 70.

Of course, the identification method according to the invention, applied to the automatic category determination does not provide a rigorously proportioned image of the identified vehicle. In fact, as the length information is not recorded in this version of the invention, the shape of the silhouette acquired depends on the crossing speed of the vehicle in the field of view of the linear camera.

Figure 8:
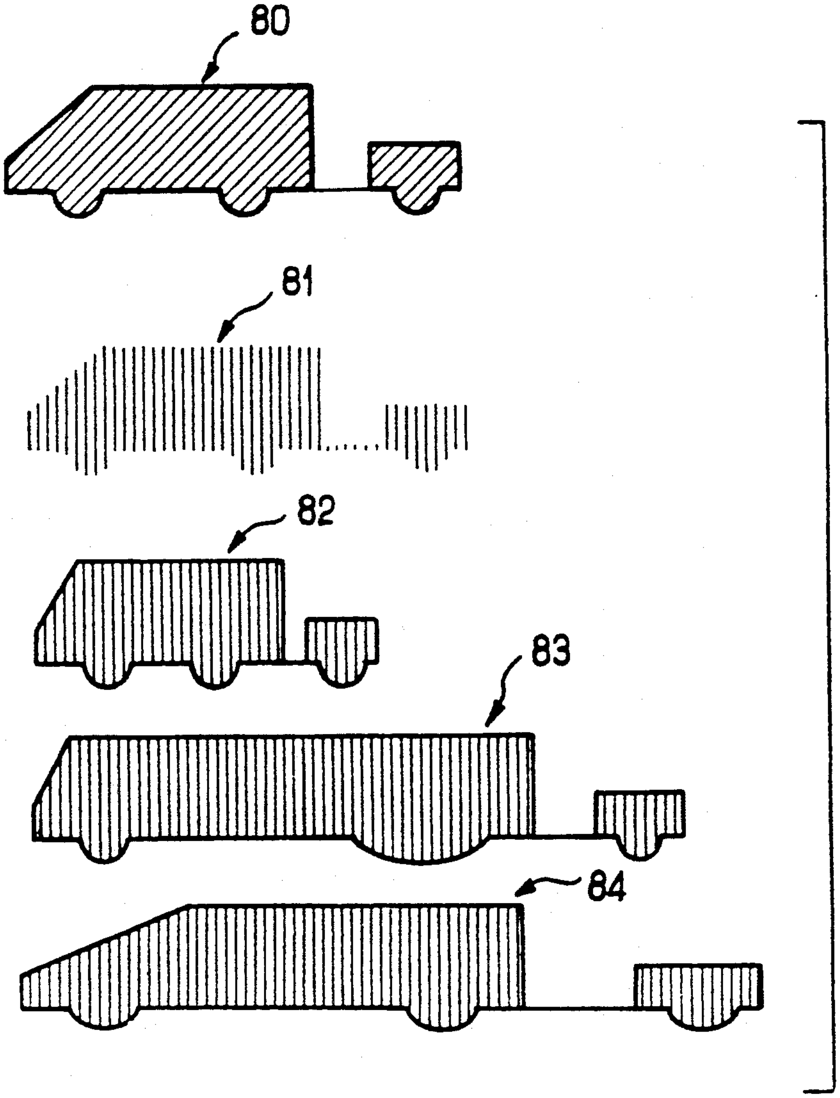
FIG. 8 illustrates schematically the various deformations of a vehicle profile, encountered in the identification method according to the invention.

Thus, a vehicle whose actual profile silhouette is shown in 80, on referring to FIG. 8, will be displayed on the checking screen of the processing means of the system, by a juxtaposition 81 of linear images which will be able to show the following silhouette deformations:

compacted 82, in the case of rapid crossing of the vehicle, dilated 83, in the case of slow crossing, longitudinally deformed 84, in the case of variable speed crossing.

However, this silhouette information has no bearing on the automatic category determination procedure insofar as this determination takes into account only shape and height characteristics, and not the effective length of the vehicle.

Figure 10:
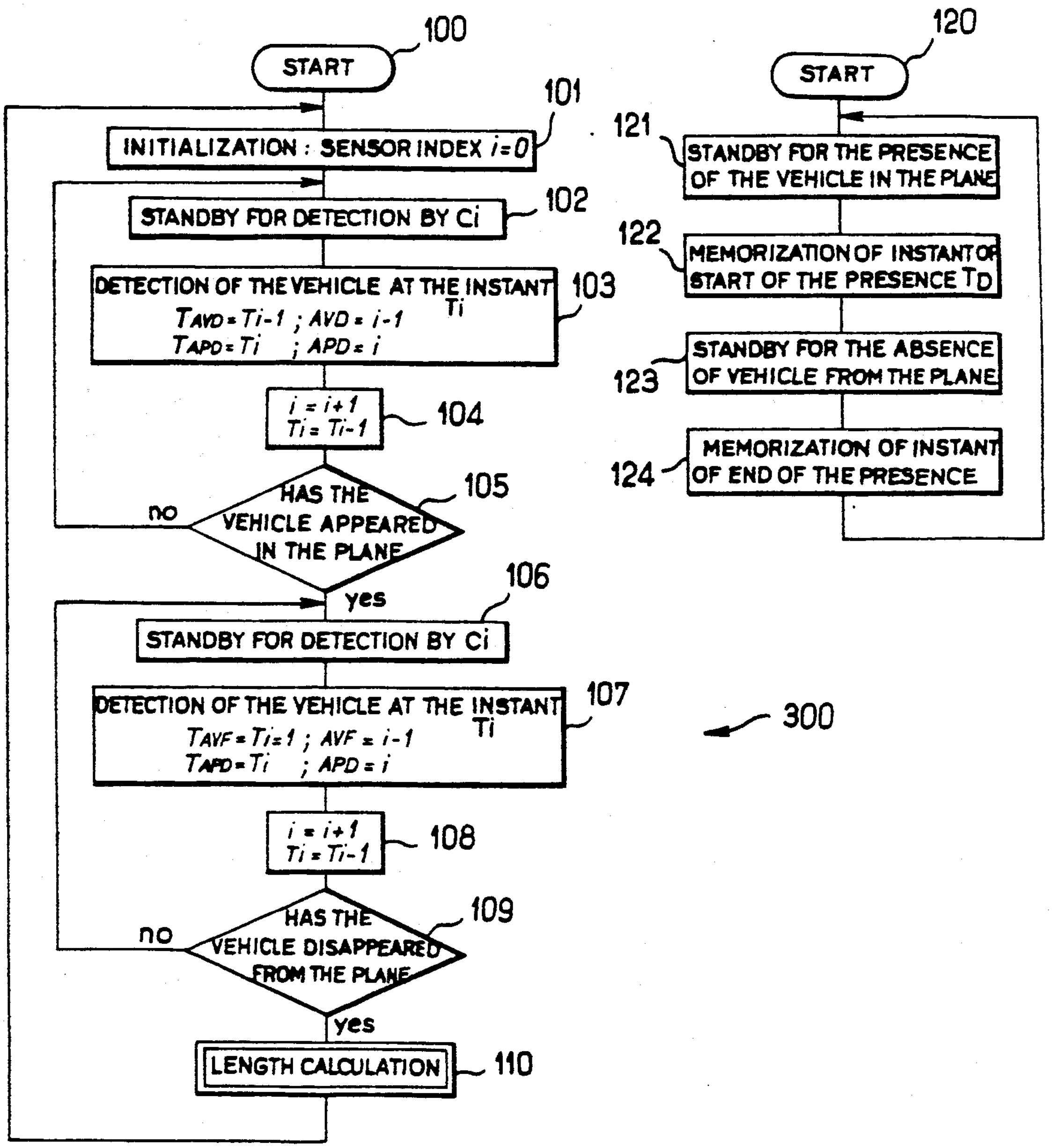
FIG. 10 is a flow diagram of a length determining software module of the method according to the invention.

The operation of the length determining system implementing the method according to the invention will now be described, on referring to FIGS. 9 and 10.

The network of sensors 42, 43, placed in a series of vertical planes perpendicular to the movement axis, is charged with supplying spatio-temporal information on the movement of a vehicle, or more generally of an object following the movement axis A of the path 2'. The combination of this information with the silhouette acquired by the linear camera 4 makes it possible to obtain a proportional image of the profile of the vehicle and, in particular, its length. Detector/reflector pairs 42, 43 are placed preferably on each side of the field of view of the camera 4, at an essentially constant height and over a length of path greater than or equal to the maximum length of the vehicles that it is planned to measure. The spacing between sensors can either be constant or variable. But in either case, a precise knowledge of the distances between any pairs of sensors is required for the implementation of the length determining method.

There follows a list of the parameters and variables recorded by the calculator 7 in the course of a measurement:

AVD: index of the last sensor of the network 42, 43 having detected the presence of the vehicle 3 before the start of the detection of the vehicle 3 in the observation plane of the linear camera 4, TAVD: instant of the start of the detection of the vehicle 3 by the sensor with the previously mentioned index, TD: instant of the start of the presence of the vehicle 3 in the observation plane, APD: index of the first sensor of the network 42, 43 detecting the presence of the vehicle after the start of the presence of the vehicle in the observation plane (APD=AVD+1), TAPD: instant of the start of the detection of the vehicle by the sensor with the previously mentioned index, AVF: index of the last sensor of the network having detected the presence of the vehicle before the end of the detection of the presence of the vehicle in the observation plane, TAVF: instant of the start of the detection of the vehicle by the sensor with the previously mentioned index, APF: index of the first sensor of the network detecting the presence of the vehicle after the end of the presence of the vehicle in the plane (APF=AVF+1)

TAPF: instant of the start of the detection of the vehicle by the sensor with the previously mentioned index.

Let $C_i$ be the sensor with index i, comprising a detector/reflector pair 42.i, 43.i, on referring to FIG. 9.

Let d ($C_i$, $C_j$) be the value of the distance separating the sensors with indices i and j of the network.

The length determining method according to the invention comprises, on the one hand, a processing of abovementioned parameters and of variables transmitted by the network of the sensors to the calculator 7, and on the other hand, the processing of the images acquired by the linear camera. These two processings are simultaneous, on referring to the flow diagram in FIG. 10.

After initialization steps 100, 120 of the various detection and acquisition devices, a sensor (i=0) index initialization 101 is carried out, then the system is placed on standby 102 for a vehicle crossing detection by the sensor $C_i$.

When a vehicle is detected by the sensor $C_i$ at an instant $T_i$ (step 103), the values $T_{i-1}$, $T_{i}$, $_{i-1}$ and $_i$ are respectively assigned to the abovementioned variables TAVD, TAPD, AVD and APD. A step 104 for incrementation of the index i and for decrementation of the index of the variable $T_i$ is then carried out. There follows a test 105 for determining whether the vehicle 3 has appeared in the observation plane 12 of the camera 4. If the vehicle has not yet appeared in the observation plane, the series of the abovementioned steps 102 to 105 is repeated. If the vehicle has indeed appeared, the identification and measurement system 90 is placed on standby 106 for detection by a sensor $C_i$. After a detection 107 of the vehicle by the sensor $C_i$ at an instant $T_i$, the values $T_{i-1}$ $T_{i}$, $_{i-1}$ and $_i$ are respectively assigned to the variables TAVF, TAPD, AVF and APD. Then a step 108 for incrementation of the index i and for decrementation of the index of the variable $T_i$ is carried out and followed by a second test 109 to determine whether the vehicle 3 has disappeared from the observation plane. If it has not disappeared, there is a repetition of the steps 106 to 109. In the opposite case (disappearance of the vehicle from the observation plane), a step 110 for calculation of the length of the vehicle is carried out.

In parallel with this procedure, a step 121 for standby of the presence of the vehicle in the observation plane is carried out and followed by a step 122 for memorizing the instant $T_D$ of the start of presence of the vehicle, a step 123 of standby of the absence of the vehicle from the observation plane and finally, a step 124 of the instant $T_F$ of the end of presence.

By way of example, if the network 42, 43 of sensors has a constant spacing of value E, an expression for the estimated length L of the vehicle is $$L = E\cdot\left(|AVF - APD| + \frac{TAPD - TD}{TAPD - TAVD} - + \frac{TF - TAVF}{TAPF - TAVF}\right) \quad (1)$$

It is further possible to neglect the terms involving the time to obtain a lower bound on the length, and to give the value 1 to the time ratios to obtain an upper bound on the said length. Thus, the following bounding is obtained, which simplifies the processing but diminishes the precision:

$$E.\,|AVF-APD|<L<E.\,|AVD-APF| \quad (2)$$

Figure 11A:
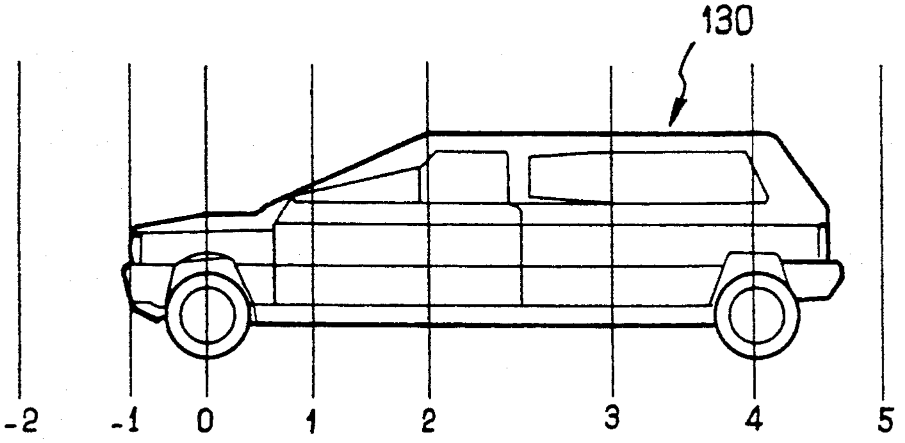
FIG. 11A shows a theoretical vehicle profile obtained with a length determining and identification system according to the invention with the localization of the detectors superimposed.

By way of example, FIG. 11A shows an acquired silhouette 130, marked with detectors transitions, referenced by the indices $_{-2,\ -1,\ 0,\ 1,\ 2,\ 3,\ 4,\ 5}$.

With E the effective spacing between the detectors, the effective length L of the vehicle can be bounded in the following manner:

$$5D<L<7D \qquad (3)$$

This allows a rough estimation in the graduated mode of the length of the identified vehicle. A finer estimation of this length can be obtained in the manner previously described (cf. formula 1).

It is possible that a vehicle is close to the maximum measurable length. In this event, it is probable that the last detector will be obscured before the end of the capture of the silhouette. In this event, edges corresponding to the reconstruction of the beams on the detectors are used to time-reference the cutting of the vehicle into slices.

Figure 11B:
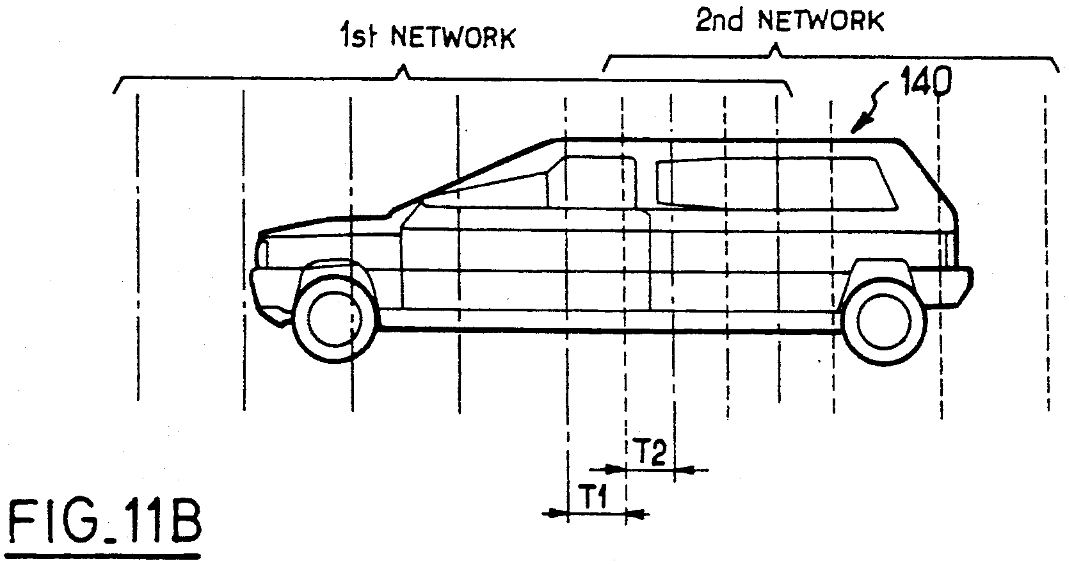
FIG. 11B shows a third profile and a superimposed network.

Thus a second network is obtained, on referring to FIG. 11B. The two networks are locked-in, thereby estimating the difference between the two networks by approximation to a constant speed during the slice. In this way, the actual distance corresponding to the space between one of the borders of the slice can be estimated. This constitutes a slice of different thickness to the others and which ensures the junction of the two networks.

Thus, with T1 and T2 the durations between the instants of detection corresponding to the junction transitions between the two networks shown in FIG. 11B, and the sum T1+T2 corresponding to a predetermined movement D, it is easy to show that the length L of the vehicle 140 can be bounded, in the particular example in FIG. 11B, in the following manner:

$$2D + \frac{T1}{T1 + T2} \cdot D + 3D < L < 3D + \frac{T1}{T1 + T2} \cdot D + 4D \qquad (4)$$

Figure 11C:
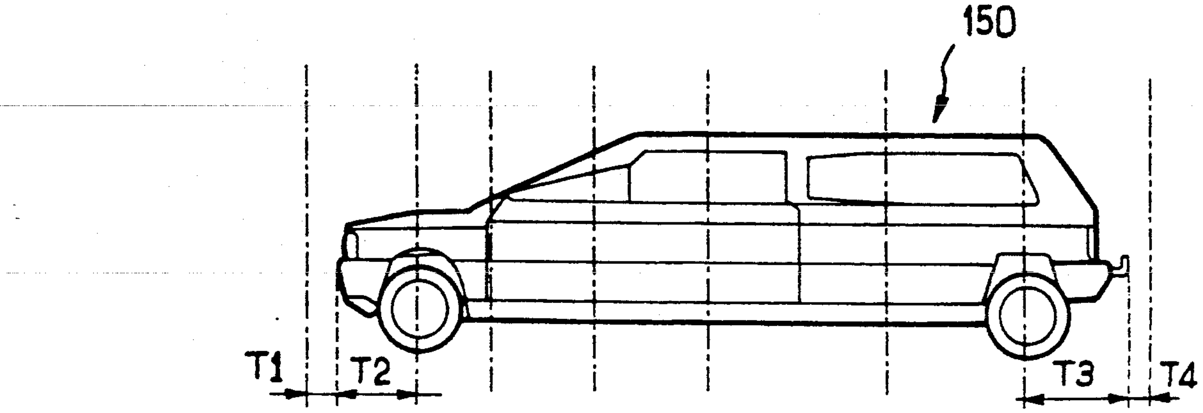
FIG. 11C shows a extrapolation of the incomplete slices which constitute the ends of the vehicle.

In higher precision mode, the length measuring system according to the invention can extrapolate the length of the incomplete slices which constitute the ends of the vehicle 150, on referring to FIG. 11C. The time for these ends to cross in front of the linear camera can be measured, on the silhouette, with the sampling precision.

For a slice containing one end of the vehicle, the length and the crossing time of the slice are known by counting the samples. From these the mean speed of the vehicle 150 during this slice is deduced, and then the length of the ends from the product of the speed and the times T2, T3. Thus a relatively precise estimate of the length of each of the ends is obtained.

The total length of the vehicle can then be estimated, in the particular example in FIG. 11C, $$L = D \cdot \left( 5 + \frac{T2}{T1 + T2} + \frac{T3}{T3 + T4} \right) \qquad (5)$$

However, the interpolation of speed by the calculation of the ends is not rigorously exact if the vehicle undergoes acceleration. The maximum acceleration (positive or negative) that a vehicle can in practice undergo in the identification zone can thus be used as additional information. In this way it will be possible to attribute an uncertainty to the estimated speed and hence to the end calculation.

It is also possible to use a model of uniformly accelerated motion and to calculate this acceleration on the slices which precede or follow the end of the vehicle. Knowing this acceleration, the instantaneous speed of the end and its length can be calculated.

Such an identification and length measurement system ensures perfect separation of the vehicles with the aid of the detection of the silhouette by linear camera. The precision of the system is adaptable by modification of the separation between the optical detectors. In addition, the system can take into account a random curve of speed of the vehicle. The vehicle can come to rest or even effect a detectable backward travel. In this event, the silhouette continues to be detected and algorithms can limit the amount of information to be stored. The non-occultation of the subsequent detectors or the reconstruction of the latest beams occulted allows non-addition of lengths and even decrementation of the "slice" counter if this is necessary.

Furthermore, it is possible to adapt the length of the detector zone as a function of the nature of the vehicles to be measured. Thus, the length of the network of sensors can be diminished, knowing that the longest vehicles are necessarily of several parts, such as a tractor and trailers, for which each sensor of the network will be able to detect the relative discontinuity.

Of course, the invention is not limited to the examples described and represented and numerous developments can be applied to these examples without exceeding the scope of the invention.

Thus, any complementary detection device, magnetic or optical for example, can be associated with the identification systems which have just been described, in order, for example, to alleviate any ambiguity between a stationary vehicle and the filming background and to free the system from untimely changes in lighting of the background.

Thus an axle detector can- be added to confirm the result of the image analysis or even to intervene partially in localization algorithms.

In addition, in the event of a large distancing of the identification system from the toll booth a follow-up of the approaching vehicles can be provided, implementing, for example, an accounting of the processing, and a placing in waiting lane of the processing results.

Furthermore, image acquisition means other than a linear camera can be provided, such as by way of example, an assembly of single beam optical sensors, connected in such a way as to cover an observation plane or a field scan optical sensor. The optical detectors of the length measurement system such as those described above can be replaced by single beam optical detectors, ground detectors of the axles of the vehicle of pneumatic or piezoelectric type, or even ultrasonic detectors.

I claim:

1. Method for identifying an object (3) in motion, in particular a vehicle, said object moving inside a predetermined identification zone (2) following a predetermined movement axis (A), which method comprises the steps of:

acquiring periodically images (52) in a predetermined field of view (26), essentially vertical and of a width narrower than its height, said field of view (26) cutting the identification zone (2) at a predetermined angle of intersection and defining an observation plane, checking nature of image background in the field of view (26), to obtain background reference information in absence of the object (3) in the field of view (26), and processing the images (52) acquired in combination with the background reference information, to extract therefrom a silhouette of the object (3) having crossed the field of view (26).

2. Method as claimed in claim 1, wherein the processing of the image (52) comprises, at the completion of each acquisition of the image, the following substeps of:

differencing (53) between the acquired image and a reference image, leading to a resultant image, comparing (55, 57) the resultant image with a predetermined threshold image, leading, if the resultant image exceeds the threshold image, to a step of storing (58) the resultant image and, in an opposite event, to a step of assigning (56) the resultant image as a new reference image, indicating an absence of the object (3) in the field of view (26), said step of storing (58) being followed by a step of acquiring (59) a new image, the step of differencing (60) and then the step of comparing (61, 62);

whereby detection of the resultant image below the threshold image leads to a step of processing (63) stored resultant images to extract therefrom the silhouette of the object having crossed the observation plane.

3. Method as claimed in claim 1, wherein the checking of the nature of the image background comprises the substep of lighting a surface (9) of the identification zone (2) included in the field of view (26) and also lighting predetermined parts of the observation plane.

4. Method as claimed in claim 3, wherein the lighting substep is synchronized with the step of periodically acquiring images.

5. Method as claimed in claim 3, wherein the lighting substep is carried out continuously.

6. Method as claimed in claim 3, wherein the lighting substep is carried out periodically with a predetermined frequency, preferably highly relative to a frequency of the step of periodically acquiring images.

7. Method as claimed in claim 1, wherein the step of processing the images acquired comprises a substep of determining (200) specific geometric characteristics of the object (3) to be identified, from the extracted silhouette, followed by a substep of associating the object (3) with a category defined by a predetermined combination of specific geometric characteristics.

8. Method as claimed in claim 7, wherein the step of determining (200) specific geometric characteristics comprises a substep (162) of determining whether the object (3) is constituted from at least two distinct parts joined together by a connecting structure.

9. Method as claimed in claim 8, wherein the step of determining (200) specific geometric characteristics comprises a substep (163) of seeking relative minima of the silhouette of the object (3), corresponding to parts of the object (3) in contact with a surface of the identification zone (2).

10. Method as claimed in claim 1, wherein the step of processing the images acquired comprises a substep of determining height of the object (3) identified, from the extracted silhouette and from predetermined information on localization of the field of view (26) relative to the identification zone (2).

11. Method as claimed in claim 1, which further comprises a step of detecting the presence of the object (3) in a predetermined part of the identification zone (2).

12. Method as claimed in claim 1, wherein the field of view (26) is limited so that only a part of the silhouette of the object (3) is acquired.

13. Method as claimed in claim 2, wherein the step of storing the resultant image comprises a substep of memorizing solely extreme contours of the silhouette of the object (3) under observation.

14. Method as claimed in claim 1, which further comprises the steps of:

detecting a presence (103, 107) of the object (3) in fixed successive detection planes in the identification zone (2), essentially perpendicular to the movement axis (A), situated on either side of the field of view (26) at predetermined respective distances from the field of view (26), to provide unidimensional spatio-temporal information on movement of the object (3) in the identification zone (2), wherein the step of processing the images acquired further comprises a substep (300) of determining a length of the object (3) following the movement axis (A) from the extracted silhouette and from spatio-temporal information obtained during the detecting step.

15. Method as claimed in claim 14, wherein the detection planes are arranged within the identification zone (2) so that separations between two fixed successive detection planes are essentially equal.

16. Method as claimed in claim 14, wherein the fixed successive detection planes are situated on either side of the observation plane.

17. Method as claimed in claim 14, wherein the length determining substep comprises a further substep of determining speed of the object (3) crossing the fixed successive detection planes, each detected crossing between two fixed successive detection planes providing a corresponding item of speed information, and comprises a further substep of extrapolating motion of the object (3) to a uniformly accelerated motion.

18. System (1, 20, 90) for identifying an object (3) in motion, in particular a vehicle, said object (3) moving inside a predetermined identification zone (2) following a predetermined axis of movement (A), which system comprises:

means (4) for periodically acquiring images in a predetermined field of view (26), essentially vertical and of a width narrower than its height, said field of view (26) cutting the identification zone (2) at a predetermined angle of intersection and defining an observation plane, means (5, 6, 9, 10) for checking nature of an image background in the field of view (26) with an aim of obtaining background reference information, and means (7) for processing the images acquired in combination with the background reference information, and for extracting therefrom a silhouette of the object (3) having crossed the observation plane.

19. System (1, 20) as claimed in claim 18, wherein the means for checking the nature of the image background comprise means (5, 56, 21, 23, 28, 32) for lighting predetermined parts of the field of view (26).

20. System (1, 20) as claimed in claim 19, wherein the means for checking the nature of the image background further comprise means (9, 10) for reflecting light coming from some of the lighting means (5, 6, 28) towards the image acquiring means (4).

21. System (1, 20) as claimed in claim 20, wherein the identification zone (2) includes a predetermined path (2'), and further wherein the light-reflecting means (9, 10) comprise bands (9) of reflective material placed on a part of the predetermined path (2') situated in the field of view (26).

22. System (1, 20) as claimed in claim 21, wherein the light-reflecting means (9, 10) further comprise bands (10) of reflective material placed in the field of view (26) on a predetermined background plane (11, 22) opposite the image acquiring means (4).

23. System (1) as claimed in claim 20, wherein some of the lighting means (5, 6) are situated in immediate proximity to the image acquiring means (4).

24. System (20) as claimed in claim 19, wherein some of the lighting means (5, 6, 21, 23, 28, 32) comprise direct lighting means (21, 23) placed in the field of view (26) on a predetermined background plane (22) opposite the image acquiring means (4) and means (28), situated in proximity to the image acquiring means (4), to light a part of the predetermined path (2') situated in the field of view (26).

25. System (1, 20) as claimed in claim 19, further comprising means (31) for supplying one of the lighting means (32) with energy.

26. System (1, 20) as claimed in claim 25, wherein the energy supplying means (31) are arranged so that one of the lighting means (32) delivers a periodic light with a predetermined frequency.

27. System (1, 20) as claimed in claim 26, wherein the energy supplying means (31) are arranged so that one of the lighting means (32) is synchronous with the periodically image acquiring means (4).

28. System (1, 20) as claimed in claim 18, wherein the image processing means (7) comprises a central calculating means (30) for receiving image information in digitized form coming from the image acquiring means (4) and also comprises a memory (30*c*) and means (37) for displaying the extracted silhouettes of the objects (3).

29. System (1, 20) as claimed in claim 28, wherein the image acquiring means (4) comprise a linear camera means (4) for digitizing and delivering to the processing means (7) an image taken in the field of view (26).

30. System (90) as claimed in claim 18, further comprising means (42, 43) for detecting a presence of the object (3) to be identified in fixed planes within the identification zone (2), essentially perpendicular to the axis of movement (A) and situated at predetermined respective distances from the observation plane, and means for supplying unidirectional spatio-temporal information on movement of the object (3) in the identification zone (2), wherein the image processing means (7) is arranged to determine an estimation of a length of the object (3) following the axis of movement (A), from the extracted silhouette and from the spatio-temporal information coming from the detecting means (42, 43) via an interface means (40) between the processing means (7) and the detecting means (42, 43).

31. System (90) as claimed in claim 30, wherein the detecting means (42, 43) comprise a network of optical detection devices placed in the fixed planes, each optical detection device comprising an emitter/receiver detector means (42.1, . . . , 42.N) for emitting an optical beam, situated on one side of a movement path (2'), and a means (43.1, . . . , 43.N) for reflecting the optical beam towards the detector means (42.1, . . . , 42.N), situated on an opposite side of the movement path (2'), when the optical beam is not obscured.

32. System (90) as claimed in claim 30, wherein the detecting means are situated on either side of the observation plane.

33. System (90) as claimed in claim 30, wherein the detecting means are equidistant from each other.

* * * * *